United States Patent [19]

Acharya et al.

[11] Patent Number: 4,954,389

[45] Date of Patent: Sep. 4, 1990

[54] MULTI-LAYER ELECTRICALLY CONDUCTIVE ARTICLE

[75] Inventors: Ramadas U. Acharya, South Bend; Lawrence I. Hill, Granger, both of Ind.

[73] Assignee: Uniroyal Plastics Company, Inc., Mishawaka, Ind.

[21] Appl. No.: 375,764

[22] Filed: Jul. 5, 1989

[51] Int. Cl.$^5$ ............................................... B32B 3/26
[52] U.S. Cl. ................................... 428/212; 156/247; 427/372.2; 427/373; 427/374.1; 427/407.1; 428/213; 428/215; 428/283; 428/286; 428/319.7; 428/922
[58] Field of Search ................ 428/319.3, 319.7, 922, 428/212, 213, 215, 283, 286; 427/372.2, 373, 374.1, 407.1; 156/247

[56] References Cited

U.S. PATENT DOCUMENTS

| | | | |
|---|---|---|---|
| 4,208,696 | 6/1980 | Lindsay et al. ...................... | 361/212 |
| 4,301,040 | 11/1981 | Berbeco .............................. | 252/511 |
| 4,307,144 | 12/1981 | Sanders et al. ....................... | 428/240 |
| 4,363,071 | 12/1982 | Rzepecki et al. .................... | 361/220 |
| 4,414,260 | 11/1983 | Rzepecki et al. .................... | 428/212 |

FOREIGN PATENT DOCUMENTS

2824739 2/1979 Fed. Rep. of Germany .
56-26157 3/1981 Japan .

OTHER PUBLICATIONS

Faustel Engineering, Sales Brochure, "The MARK II Coater-Laminator", page 6.

*Primary Examiner*—William J. Van Balen
*Attorney, Agent, or Firm*—Pennie & Edmonds

[57] ABSTRACT

A multi-layer conductive article and method of making same wherein the article has a first layer of an organic polymer having a volume resistivity of between about $10^7$ and $10^{12}$ ohm-cm, a second layer, preferably in direct physical and electrical contact with the first layer of a conductive polyurethane having a surface resistance on the order of 100 to 900 ohms/square and a third layer in direct physical and electrical contact with the second layer of an organic polymer having a volume resistivity of $10^7$ to $10^{12}$ ohm-cm so that the article is capable of dissipating static electric charges which are impressed thereupon. The first and third layers are preferably formed of polyvinyl chloride, while the third layer can be expanded to a foam. Also, the article can be laminated to a fabric sheet to form a conductive fabric.

33 Claims, No Drawings

MULTI-LAYER ELECTRICALLY CONDUCTIVE ARTICLE

TECHNICAL FIELD

The invention relates to a multi-layer composite laminate suitable for use as an article or mat for safely dissipating static electricity from objects or persons situated thereupon.

BACKGROUND ART

A wide range of various static discharge mat constructions are known in the art. U.S. Pat. No. 4,208,696 to Lindsay et al. describes a multi-layer static-dissipative web wherein an open weave fabric in the form of cotton scrim, which is rendered electrically conductive by incorporating carbon in a latex binder, is interposed between upper and lower layers of relatively low conductivity to produce mat constructions having an overall volume resistivity between $10^{10}$ and $10^{11}$ ohm-cm and a surface resistivity on the order of 10 ohms/square.

U.S. Pat. Nos. 4,363,071 and 4,414,260 each disclose a multiple layer conductive web for dissipating a static electric charge impressed thereon, with the U.S. Pat. No. '260 patent further disclosing the use of the web laminated to a fabric base so as to form a static-dissipative upholstery material. In each patent, the web includes an upper layer of a thermoplastic polymeric material having a volume resistivity of $10^7$ to $10^{12}$ ohm-cm, a continuous thin conductive film of a thermoplastic polymeric material in direct physical and electrical contact with the upper layer and having a surface resistance on the order of $10^2$ ohms/square, and a conductive underlying lower layer in electrical contact with the underside of the conductive film in the form of an expanded thermoplastic polymeric material having a volume resistivity of $10^7$ to $10^{12}$ ohm-cm.

While each of these articles is useful, they are somewhat difficult to manufacture in that specialized equipment is needed to handle and laminate the intermediate layer to the outer layers. The present invention provides one solution to this problem in a new article.

SUMMARY OF THE INVENTION

The present invention provides a multi-layer electrically conductive mat and a method for making the same wherein the mat has an upper layer of a thermoplastic polymer with a volume resistivity of $10^7$ to $10^{12}$ ohm-cm, an intermediate layer of a conductive thermosetting material having a surface resistance on the order of 100 to 900 ohms/square, and a lower layer of an expanded thermoplastic polymer having a volume resistivity of $10^7$ to $10^{12}$ ohm-cm, wherein each layer is in physical and electrical contact with adjacent layer or layers. This mat can be laminated to an electrically conductive base fabric to form an electrically conductive coated fabric.

The upper and lower layers of the conductive mat may be made of a variety of materials, such as polyurethane, ethylene vinyl acetate, poly vinyl butyral, acrylic, acrylic/polyvinyl chloride (PVC) alloys and blends, acrylic/urethane alloys and blends, acrylic/urethane/PVC alloys and blends, rubbers and/or other commercial elastomers and alloys or blends thereof, each of which possess thermoplastic properties. The upper stratum is, however, preferably a layer of plasticized polyvinyl chloride which ranges in thickness between about 25 and 50 mils. The thickness of the intermediate layer is between 1 and 5 mils of a water-based thermosetting polyurethane which is rendered conductive by the addition of carbon black. For the intermediate layer, the most preferred material is a liquid thermosetting polyurethane, although thermosetting acrylics, and/or acrylic/urethane blends, can be used. The lower stratum is also preferably a layer of a plasticized polyvinyl chloride which ranges in thickness between 25 and 125 mils.

When a liquid thermosetting polymer is used to make the intermediate layer, this article can be made on a conventional three head coating apparatus. Also, this liquid component will permit an acceptable loading of conductive carbon black that cannot be obtained with a liquid thermoplastic coating layer. It also overcomes the problem of blisters caused by trapped volatile components in the thermoplastic material is included in the conductive layer.

DETAILED DESCRIPTION OF THE PREFERRED EMBODIMENTS

The multi-layer electrically conductive article comprises three layers: upper and lower layers of a thermoplastic polymer having a volume resistivity of between about $10^7$ and $10^{12}$ ohm-cm, and a conductive intermediate layer in direct physical and electrical contact with the upper and lower layers. The intermediate layer has a surface resistance on the order of 100 to 900 ohms/square.

Similar to those described in the prior art, both the upper and lower layers preferably comprise plasticized polyvinyl chloride. Another advantageous material for the upper and lower layers is a thermoplastic polyurethane which is compatible with the second layer. The upper layer is usually between about 25 and 50 mils thick, while the lower layer is between 25 and 125 mils thick. Also, the lower layer may be expanded into a soft foam before being fused to the other two layers, and the article may further comprise a base layer of an electrically conductive fabric sheet to form a coated fabric.

The most advantageous intermediate layer comprises a water based thermosetting polyurethane which preferably has a heat distortion temperature of at least 200° F. and which is rendered conductive by the addition of carbon black while still in the liquid phase. The specific formulation of this layer is a polyurethane latex resin available from Wilmington Leather Chemical as product No. WO-9733, which includes 5% by weight of epoxy as a crosslinker. The preferred epoxy crosslinker is also available from Wilmington Leather Chemical as product name Helastic WX-1152. The WO-9733 polyurethane, however, may be successfully utilized with other crosslinkers, such as melamines, aziridines or other epoxies in an amount ranging between 1 and 10% by weight. The thickness of the intermediate layer is between about 1 and 5 mils. This polyurethane layer provides lower density, higher heat distortion temperatures, and better elastomeric properties than thermoplastic materials. It also provides increased bond strength to further reduce the likelihood of delamination. Moreover, a conductive mat constructed with an inner layer of this polyurethane will exhibit improved dimensional stability and better overall chemical resistance compared to those made with a corresponding layer of PVC.

The manner in which the polyurethane layer is rendered conductive provides additional benefits. Carbon black can easily be added to the polyurethane while it is still in liquid form. This is a much simpler process than forming a separate conductive thermoplastic sheet, which requires higher heat and mechanical rolling. As such, the invention represents a simplification over the prior art.

In manufacture, the article is made using a conventional three head casting machine. An example of commercially available three head casting machines include the Faustel "Mark II" manufactured by Faustel Incorporated of Butler, Wis. Similar machines are available from Ramisch Kleinewefers of Dornbusch, West Germany. The upper polyvinyl chloride layer is applied onto the top of casting paper in the liquid form and then heated to cause it to solidify. The intermediate layer of polyurethane is then applied in liquid form on top of the first solidified polyvinyl chloride layer and then heated. The lower polyvinyl chloride layer is applied to the intermediate layer in liquid form and fused to the other layers while simultaneously being expanded to a foam. The product is then cooled and the casting paper is removed to obtain the article.

If desired, reinforcement in the form of a fabric sheet can be added to the foam layer or adhesively attached thereto to form a coated fabric article.

While it is apparent that the invention herein disclosed is well calculated to fulfill the objects above stated, it will be appreciated that numerous embodiments and modifications may be devised by those skilled in the art, and it is intended that the appended claims cover all such modifications and embodiments as fall within the true spirit and scope of the present invention.

What is claimed is:

1. A multi-layer conductive article comprising a first layer of a thermoplastic polymer having a volume resistivity of between about $10^7$ and $10^{12}$ ohm-cm, a second layer in direct physical and electrical contact with said first layer of a conductive thermosetting material having a surface resistance from 100 to 900 ohms/square, and a third layer in direct physical and electrical contact with said second layer of an expanded thermoplastic polymer having a volume resistivity of $10^7$ to $10^{12}$ ohm-cm so that said article is capable of dissipating static electric charges which are impressed thereupon.

2. The article of claim 1 further comprising a fabric sheet laminated to said third layer.

3. The article of claim 2 wherein said fabric sheet is electrically conductive.

4. The article of claim 1 wherein said first and third layers comprise at least one of a thermoplastic polyurethane, ethylene vinyl acetate, poly vinyl butyral, acrylic or polyvinyl chloride material.

5. The article of claim 1 wherein said second layer comprises a water-based thermosetting polyurethane which is rendered conductive by the addition of carbon black therein.

6. The article of claim 1 wherein said second layer is a thermosetting acrylic or acrylic/polyurethane material.

7. The article of claim 5 wherein said polyurethane includes between 1 and 10% by weight of a crosslinking agent.

8. The article of claim 6 wherein the crosslinking agent is an epoxy and is present in an amount of about 3-8 weight percent.

9. The article of claim 1 wherein said first and third layers comprise plasticized polyvinyl chloride.

10. The article of claim 1 wherein the third layer is expanded to a foam

11. The article of claim 1 wherein said first layer has a thickness of between about 25 and 50 mils, said second layer has a thickness of between about 1 and 5 mils, and said third layer has a thickness of between 25 and 125 mils.

12. In a multi-layer conductive article having upper and lower layers of an organic polymer having a volume resistivity of between about $10^7$ and $10^{12}$ ohm-cm with an intermediate layer in direct physical and electrical contact with said upper and lower layers and having a surface resistance on the order of 100 to 900 ohms/square, the improvement which comprises:
    formulating said intermediate layer from a liquid thermosetting material which is rendered conductive by the addition of carbon black therein;
    directly casting said intermediate layer onto the upper layer in liquid form; and
    drying said liquid intermediate layer to form a film thereof.

13. The article of claim 12 which further comprises laminating a fabric sheet to said lower layer to form a coated fabric.

14. The article of claim 13 wherein said fabric sheet is electrically conductive.

15. The article of claim 12 wherein said thermosetting material is a polyurethane resin which includes between 3 and 8% by weight of an epoxy as a crosslinking agent.

16. The article of claim 12 wherein said thermosetting is a thermosetting acrylic or acrylic/polyurethane material.

17. The article of claim 12 wherein the upper and lower layers comprise at least one of polyurethane, ethylene vinyl acetate, poly vinyl butyral, acrylic or polyvinyl chloride.

18. The article of claim 12 wherein said upper and lower layers comprise plasticized polyvinyl.

19. The article of claim 12 wherein said lower layer is expanded to a foam.

20. The article of claim 12 wherein the upper layer has a thickness of between about 25 and 50 mils, the intermediate layer has a thickness of between 1 and 5 mils, and the lower layer has a thickness between 25 and 125 mils.

21. A method of making a multi-layer conductive article which comprises:
    applying a first layer of an organic polymer in liquid form onto casting paper;
    heating said organic polymer to form a solid layer having a volume resistivity of between about $10^7$ and $10^{12}$ ohm-cm;
    applying a second layer of a conductive thermosetting material in liquid form directly onto said first layer;
    drying said layer of conductive thermosetting material to form a film having a surface resistance from 100 to 900 ohms/square;
    applying a third layer of an organic polymer in liquid form directly onto said second layer;
    heating said third layer to form a film having a volume resistivity of $10^7$ and $10^{12}$ ohm-cm;
    cooling said layers; and
    removing said casting paper to obtain an article capable of dissipating static electric charges impressed thereupon.

22. The method of claim 21 wherein said first and third layers comprise at least one of a thermoplastic polyurethane, ethylene vinyl acetate, poly vinyl butyral, acrylic or polyvinyl chloride material.

23. The method of claim 21 wherein said first and third layers comprise plasticized polyvinyl chloride.

24. The method of claim 21 which further comprises adding carbon black to said conductive thermosetting material while said thermosetting material is still in the liquid phase to render said thermosetting material conductive.

25. The method of claim 21 wherein said thermosetting material is a polyurethane resin which includes between 3 and 8% by weight of an epoxy as a crosslinking agent.

26. The method of claim 21 wherein said thermosetting material is a thermosetting acrylic or acrylic/polyurethane material.

27. The method of claim 21 which further comprises laminating a fabric sheet onto said third layer.

28. The method of claim 27 wherein said fabric sheet is electrically conductive.

29. The method of claim 21 wherein the third layer is expanded to a foam.

30. The method of claim 21 wherein said first layer has a thickness of between about 25 and 50 mils, said second layer has a thickness of between about 1 and 5 mils, and said third layer has a thickness of between 25 and 125 mils.

31. A multi-layer conductive article comprising a first layer of a thermosplastic polymer having a volume resistivity of between about $10^7$ and $10^{12}$ ohm-cm, a second layer in direct physical and electrical contact with said first layer of a conductive thermosetting material having a surface resistance from 100 to 900 ohms/square, said conductive thermosetting material being selected from the group consisting of polyurethanes, acrylics and acrylic/polyurethane blends, and a third layer in direct physical and electrical contact with said second layer of an expanded thermoplastic polymer having a volume resistivity of $10^7$ to $10^{12}$ ohm-cm so that said article is capable of dissipating static electric charges which are impressed thereupon.

32. In a multi-layer conductive article having upper and lower layers of an organic polymer having a volume resistivity of between about $10^7$ and $10^{12}$ ohm-cm with an intermediate layer in direct physical and electrical contact with said upper and lower layers and having a surface resistance on the order of 100 to 900 ohms/square, the improvement which comprises:
  formulating said intermediate layer from a liquid thermosetting material which is rendered conductive by the addition of carbon black therein, said thermosetting material being selected from the group consisting of polyurethanes, acrylics and acrylic/polyurethane blends;
  directly casting said intermediate layer onto the upper layer in liquid form; and
  drying said liquid intermediate layer to form a film thereof.

33. A method of making a multi-layer conductive article which comprises:
  applying a first layer of an organic polymer in liquid form onto casting paper;
  heating said organic polymer to form a solid layer having a volume resistivity of between about $10^7$ and $10^{12}$ ohm-cm;
  applying a second layer of a conductive thermosetting material in liquid form directly onto said first layer, said conductive thermosetting material being selected from the group consisting of polyurethanes, acrylics and acrylic/polyurethane blends;
  drying said layer of conductive thermosetting material to form a film having a surface resistance of from 100 to 900 ohms/square;
  applying a third layer of an organic polymer in liquid form directly onto said second layer;
  heating said third layer to form a film having a volume resistivity of $10^7$ to $10^{12}$ ohm-cm;
  cooling said layers; and
  removing said casting paper to obtain an article capable of dissipating static electric charges impressed thereupon.

* * * * *